United States Patent

[11] 3,589,114

[72] Inventor Roy A. Gillette
 Rockford, Ill.
[21] Appl. No. 784,154
[22] Filed Dec. 16, 1968
[45] Patented June 29, 1971
[73] Assignee J. I. Case Company
 Racing, Wis.

[54] MOUNTING MECHANISM FOR HARVESTING MACHINE
 11 Claims, 4 Drawing Figs.

[52] U.S. Cl. .................................................. 56/33
[51] Int. Cl. ........................................... A01d 45/18
[50] Field of Search .......................................... 56/11, 14,
 12, 28, 33—35, 10, 15, DIG. 9, 25, 18, 208—214,
 DIG. 14

[56] References Cited
 UNITED STATES PATENTS

| 2,645,890 | 7/1953 | Spedding | 56/25 |
| 2,984,960 | 5/1961 | Wathen et al | 56/25 |
| 3,154,902 | 11/1964 | Halls | 56/25 |
| 2,293,757 | 8/1942 | Jochumsen | 56/18 |
| 2,554,198 | 5/1951 | Kuhlman | 56/18 |
| 2,571,224 | 10/1951 | Edwards | 56/35 X |
| 2,677,226 | 5/1954 | Hyman | 56/33 X |
| 2,826,887 | 3/1958 | Wiltsey | 56/14 |

*Primary Examiner*—Louis G. Mancene
*Assistant Examiner*—J. A. Oliff
*Attorney*—Settle, Batchelder and Oltman ABSTRACT: Mounting means for a harvesting mechanism for quick attachment and release of the mechanism from a vehicle. The mounting mechanism supports the harvesting units forwardly of the main axle of the vehicle with means for simultaneously raising and lowering two units with respect to the vehicle and individual capability of adjustment and/or relative movement of each unit with respect to the vehicle and to the opposite unit. A collector unit is supported adjacent the axle on a side opposite the harvesting units and is carried on the conventional draft arms of a draft control mechanism forming part of the vehicle. The linkage means connecting the collector unit to the vehicle are arranged so as to maintain the collector unit in a substantially parallel plane at all times.

BY:
SETTLE, BATCHELDER
& OLTMAN.
ATT'YS.

BY
SETTLE, BATCHELDER & OLTMAN.

ATT'YS.

MOUNTING MECHANISM FOR HARVESTING MACHINE

BACKGROUND OF THE INVENTION

The present invention relates generally to vehicle mounted crop harvesters, and more particularly to an improved mounting mechanism for a harvesting unit permitting convenient attachment or detachment of the harvester with respect to the vehicle.

Tractor mounted harvesting units, such as cotton harvesters, have become increasingly common in recent years and usually comprise one or more harvesting elements disposed longitudinally of the tractor with a collector unit communicating with each of the harvesting units and which in turn conveys the harvested material to a collection point.

The usual agricultural tractor is designed for use in propelling and partially or wholly supporting various machines and implements and thus it is important that the various machines and implements be capable of being quickly and conveniently attached and detached from the vehicle.

It is also well known that in agricultural tractors, the rear axle structure is more suitable for carrying heavier loads and that any implement or harvesting element which is wholly supported by the tractor should necessarily have the most weight thereof distributed adjacent the rear axle of the vehicle rather than having a considerable weight on the front end of the tractor which of course impairs control of the tractor.

In mounting cotton harvesting units on tractors, it is preferable that the harvesting units be disposed forwardly of the operator's seat so as to be within the normal vision of the operator while he is steering and propelling the vehicle. If harvesting units are disposed below or rearwardly of the axle structure, it is of course very difficult to maintain a constant visual control of the harvester unit as well as the tractor since the operator must normally be looking forwardly to maintain an accurate direction of movement.

Various types of mounting mechanisms have been proposed for quickly and easily detaching and attaching a single harvester unit to a tractor. Examples of such units are shown in the Sawyer U.S. Pat. No. 2,936,562 which discloses a harvesting unit disposed outside the rear wheels of the vehicle with a collection mechanism attached to the vehicle. While this frame structure is simple and convenient to attach to the vehicle, there are several serious drawbacks, the primary drawback being that only a single harvesting unit is capable of being utilized with the tractor and that the harvesting unit is disposed outside the body of the tractor so as to increase the transverse dimension thereof making it very difficult to control. Of course, if a second harvester unit were attempted to be attached to such a device, it would be virtually impossible for controlling such a vehicle.

SUMMARY OF THE INVENTION

The present invention provides a simple and efficient mounting mechanism for a pair of cotton-harvesting units and a single collector unit in which each of the units are individually supported at the common pivot axis for all three units. The harvesting units are supported at one end for simultaneous raising and lowering of both units with respect to the tractor and individual adjustment and relative movement with respect to each other and with respect to the tractor. The collector unit is completely separated from the harvester units and is mounted for individual control through the use of conventional draft arms forming part of the draft control system of a conventional tractor.

Thus, the primary object of the present invention is to provide a simple and effective mounting mechanism for a pair of cotton-harvesting units and wherein the majority of the weight of the units is concentrated adjacent the transverse axle of the tractor.

Another object is to provide a mounting means for a harvesting unit in which a pair of harvesting units are supported by a linkage system which includes power means for simultaneously raising and lowering both units and is capable of individual adjustment and movement of each of the units.

A further object is to provide a mounting mechanism for a collector element of a harvesting machine through the draft links and wherein the collector element is normally maintained within a common plane during raising and lowering of the element.

Other objects of this invention will appear in the following description and appended claims, reference being had to the accompanying drawings forming a part of this specification wherein like reference characters designate corresponding parts in the several views.

DETAILED DESCRIPTION:

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
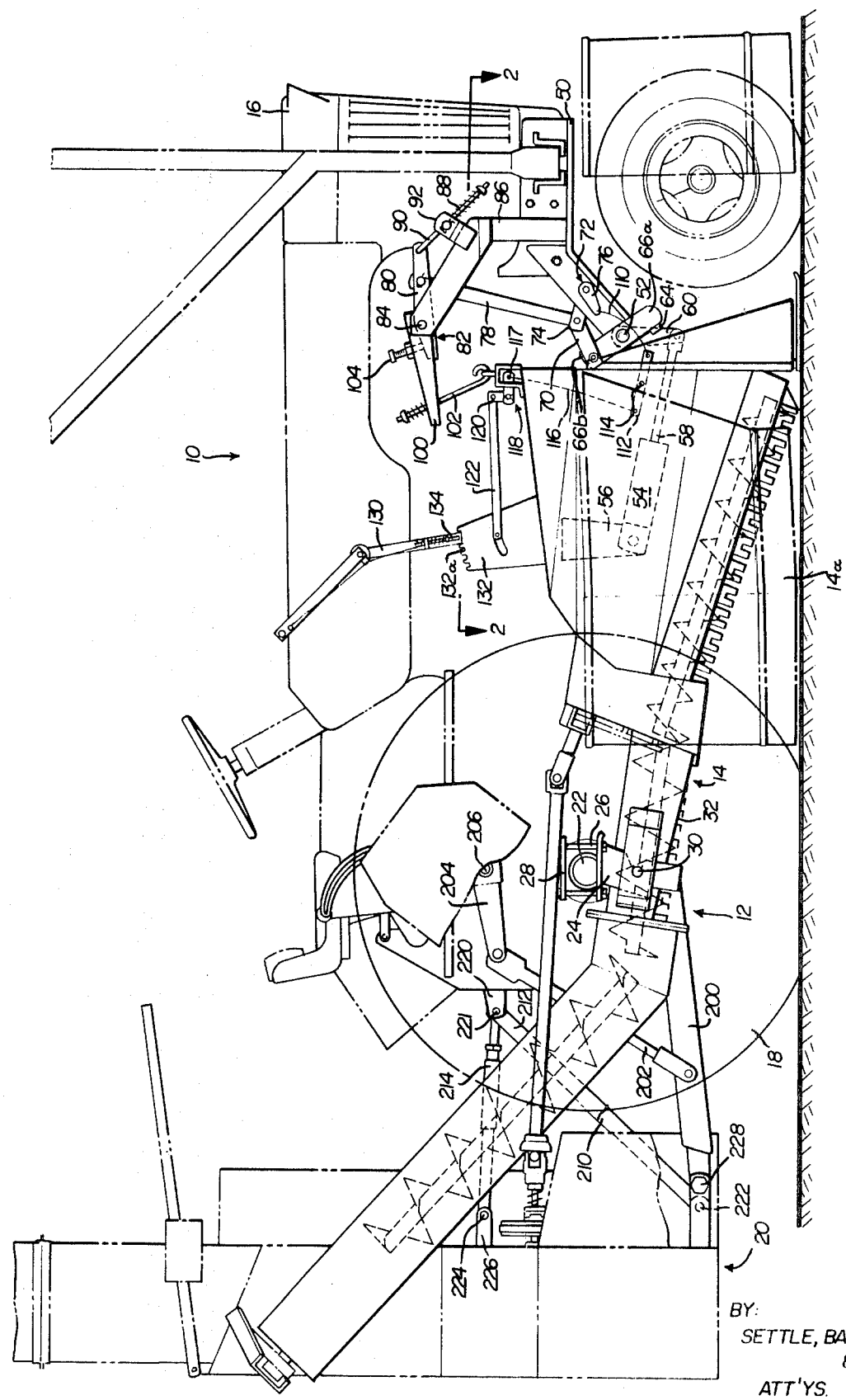
FIG. 1 is a side elevational view of a tractor having the harvesting units supported thereon by the mounting means of the present inventions.
Figure 2:
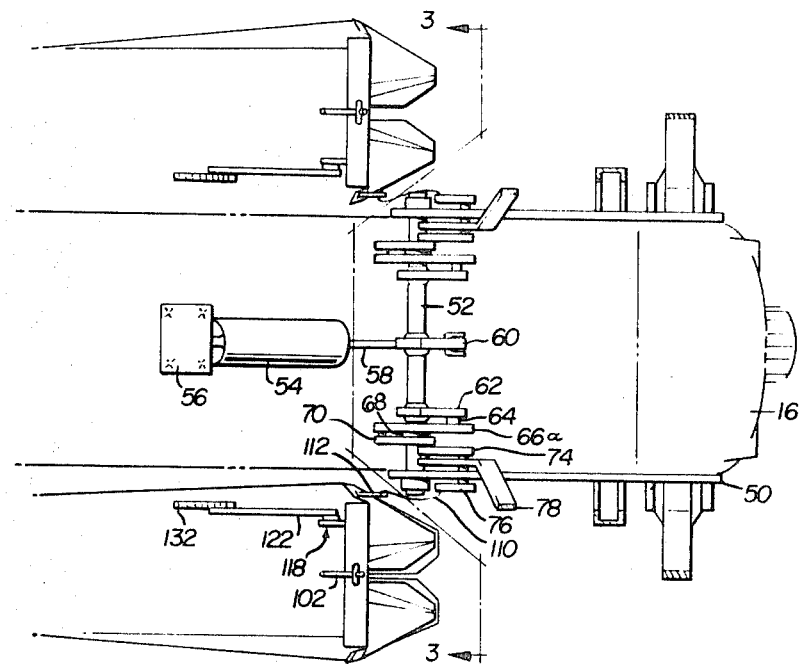
FIG. 2 is a plan view of the harvesting units and the mounting mechanism therefor taken along lines 2-2 of FIG. 1.
Figure 3:
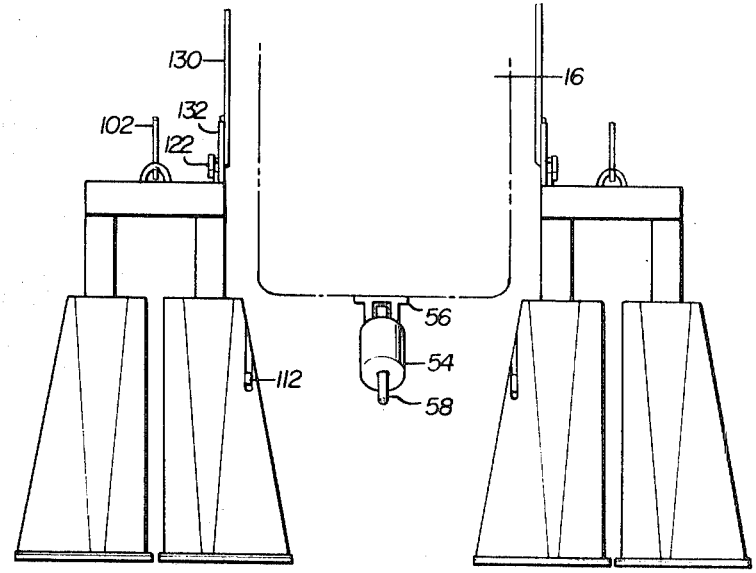
FIG. 3 is a vertical sectional view of the mounting mechanism taken along lines 3-3 of FIG. 2.

FIG. 1 of the drawings discloses a tractor 10 having a harvesting mechanism 12 attached thereto. The harvesting mechanism 12 includes a pair of harvester units or elements 14 (only one being shown in FIG. 1) disposed on opposite sides of the longitudinal center of the vehicle formed by the body 16 and disposed between the body 16 and the wheels 18 (again only one being shown in FIG. 1) supported on opposite ends of an axle 22. The harvesting machine 12 also includes a collector unit 20 communicating with the rear end of each of the harvester elements 14.

According to the present invention, the respective harvester elements are supported on the vehicle adjacent the main axle 22 by mounting means which allows the respective units to be easily attached and detached from the vehicle. The mounting means for each unit includes a pair of downwardly depending axially spaced plates 24 which are supported on the axle 22 and fixedly secured thereto by bolts 26 and attaching plate 28. The spaced plates 24 each have a forwardly opening recess 24a which defines a pivot for pins 30 carried on opposite sides of an auger housing 32 forming part of the harvesting element 14. The pins 30 are fixedly secured to opposite sides of the auger housing 32 by plates 34 and the entire housing is reinforced by gusset plate 36. Each plate 34 has an inclined portion 34a which aides in guiding the plate 24 between the plate 34 and the auger housing 32.

Figure 4:
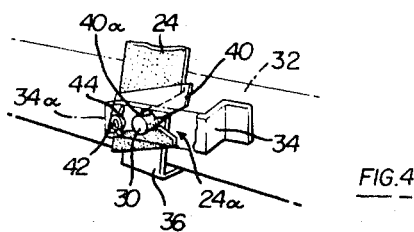
FIG. 4 is an enlarged fragmentary view showing the pivot support for the harvesting unit.

Locking means are provided for maintaining the pin 30 in a slot 24a formed in each of the plates 24. The illustrated locking means includes a further plate 40 pivoted on a pin 42 carried by each of the plates 24 with a spring 44 interposed between each of the plates 40 and the pins 42 so as to bias the plate 40 to the position shown in the drawings. As more clearly shown in FIG. 4, the plate 40 has a vertically extending slot 40a into which the pin 30 is received and wherein the plate 40 securely locks the auger housing 32 for pivotal movement only with respect to the pin 30.

The forward ends of each of the harvesting units 14 are mounted for individual adjustment with respect to the body of the tractor as well as for simultaneous adjustment of both units by a single control mechanism. This feature is of extreme importance providing a commercially acceptable type of unit since it is many times necessary to individually adjust the respective units due to variations in ground contour on opposed sides of the longitudinal housing 16 of the tractor. Furthermore, it is also necessary that each of the units be capable of independent movement relative to the tractor as, for example, when the forward end of the unit encounters an obstacle, such as a rock.

The mounting mechanism of the present invention includes support brackets 50 secured to opposite sides of the longitudinal body 16. The brackets 50 support a transversely extending shaft 52 which is adapted to be rotated in opposite directions by a cylinder assembly including a cylinder 54 pivotally supported on a bracket 56 fixedly secured to the tractor housing and a piston rod 58 pivotally supported or connected to a crank arm 60 welded or otherwise fixedly secured to the shaft 52. Adjacent opposite ends of the shaft 52, arms 62 are fixedly secured, as by welding, to the shaft 52 and each arm has a stop member 64 fixedly secured to the free end thereof. Adjacent each of the respective arms 62 and pivoted for free movement on the shaft 52 is a freely pivoted link 66 which has one end 66a disposed in the path of the block 64. The respective links 66 are maintained on the shaft 52 by bearings 68.

The opposite free end 66b of each of the links 66 is connected through connecting strap 70 to one portion of a bellcrank 72 having crank arms 74 and 76 with the bellcrank 72 being supported for free pivotal movement on the support bracket 50. The connecting strap and the arm 74 of bellcrank 72 are also connected by a common strap 78 to a first portion 80 of a linkage 82 pivoted on a pin 84 supported on an arm 86 forming part of the bracket 50.

The link 80 is spring biased to a first position by a spring 88 surrounding a rod 90 connected to the free end of the arm 80 and slidably received in a bracket 92 forming part of the bracket or arm 86.

A second link 100 forming part of linkage 82 is also pivotally supported on pin 84 and has the free end thereof connected through a spring biased rod 102 to the upper end of the housing 14a of one of the units disposed on one side of the tractor. The link 100 has an adjustable stop 104, in the form of a screw which has the free end thereof normally biased into engagement with the link 80. Thus, it can be seen from an inspection of FIG. 1 that the links 80 and 100 rotate as a unit upon downward movement of the strap 78 while defining a lost motion connection when link 100 is pivoted in a clockwise direction, for a purpose which will become apparent hereinafter.

As was indicated above, the mounting means for each unit further includes manually adjustable means for individually adjusting the associated unit with respect to the vehicle.

As more clearly shown in FIG. 1, the second arm 76 of bellcrank 72 is connected by an adjustable length cable 110 to a lever 112 pivoted intermediate its ends on a pin 114 fixedly secured to the housing 14a. The opposite end of the link 112 is likewise connected by a cable 116 to a bellcrank 118 pivotally supported on the housing 14a adjacent the upper end thereof. One arm 120 of bellcrank 118 is connected by link 122 to a control lever 130 pivoted on the housing 14a with a quadrant 132 disposed adjacent the lower end thereof which is notched on the upper surface or edge thereof for reception of a spring biased locking pin 134 which maintains the lever 130 in the adjusted position.

The respective links and cables 110—122 may be considered a single linkage means pivoted intermediate its ends on the housing 14a with opposite ends respectively connected to the lever 130 and the bellcrank 72.

Thus, it will be seen that rotation of the rock shaft of shaft 52 by extension and retraction of the piston 58 within cylinder 54 will cause rotation of the freely pivoted link 66 to raise and lower strap 78 causing a simultaneous pivoting both of the links 80 and 100 to raise or lower the entire units 14 by pivoting each of the units about the pivot pins 30 carried adjacent the rear end thereof.

Individual adjustment of each of the units is accomplished by moving the manual control lever 130 in the appropriate direction which in turn causes a pivotal movement of bellcrank 118 to pivot the lever 112 about pin 114 causing an individual adjustment of each of the units. The spring biased rod 102 supports the majority of the weight of the unit thus allowing for individual adjustment of each of the units with a minimal amount of force applied to the manual control lever. Also, the spring biased rod 102 as well as the capability of relative clockwise movement of the link 100 with respect to the link 80 and the capability of free counterclockwise rotation of link 66 on shaft 52 will allow each of the individual harvester units 14 to freely move upwardly with respect to the body 16 of the tractor, as when it encounters an obstacle on the ground.

In actual operation, it is contemplated that the piston rod will be either in the fully extended or fully retracted position to move the two units between raised and lowered positions and the individual units will be properly adjusted in the lowered position by either the manual control lever 130 and/or the set screw 104.

According to another aspect of the present invention, the entire collector unit 20 is mounted for individual support and adjustment adjacent the rear end of the tractor and is connected to a conventional draft control system forming part of the tractor. This aspect of the present invention is of extreme importance in providing a commercially acceptable unit since the entire collector unit will be maintained in a fixed position while the individual harvesting elements or mechanisms are being individually or simultaneously adjusted. This results in the advantage that the unit will be appropriately aligned with whatever mechanism is utilized for storage of the harvested material, such as cotton.

The conventional draft control mechanism includes a pair of draft arms 200 pivotally supported on the tractor and adapted to be raised and lowered with respect to the tractor by draft links 202 each having one end connected to a draft arm 200 and the opposite end connected to an arm 204 which is fixedly secured to the rockshaft 206. Thus rotation of the rockshaft 206 will cause a raising and lowering of the draft arms 200.

The connection between the collector unit 20 and the draft control mechanism of the tractor includes three links 210, 212 and 214. The link 214 is preferably of the adjustable length type and has its first end connected to pivot pin 221 with the opposite end thereof connected by pivot pin 224 to a bracket 226 forming part of the collector unit 20. The draft arms 200 are pivotally supported by pins 228 defined on the collector unit 20. The links 210 and 212 are supported on opposite sides of a bracket 220 forming part of the tractor housing by a pin 221 and extend downwardly with the free ends thereof connected to pins 222 forming part of the collector unit 20. The links 210 and 212 are of fixed length and lock the collector unit in proper position with respect to the harvester units.

As can be seen from an inspection of FIG. 1, the respective pins 222 and 224 are vertically spaced on the collector unit. Thus, the entire unit is connected to the tractor by a single additional link 214 and the raising and lowering of the collector unit will maintain the entire unit in a substantially vertical plane which is important in maintaining the proper adjusted relationship between the collector unit and the storage tank or other unit utilized for collection of the harvested material. The links 210 and 212 are then utilized for locking the collector unit in a predetermined position with respect to the rear ends of the harvesting units. The locking links define a predetermined operating position for the collector element and are of fixed length to insure that the collector element is in proper position with respect to the harvester elements.

As can readily be appreciated from the above description, the mounting mechanism for the harvesting unit allows for a quick attachment and detachment of the respective harvesting elements as well as the collector elements from the tractor. Thus, during the harvesting season of the particular material being harvested by the present machine, such as cotton, the brackets 50, 56 and plates 24 may be fixedly secured to the tractor and each harvesting element 14 may readily and simply be attached or detached by raising the locking plate 40 and driving the tractor into the open end of the plates 34 and thereafter releasing the spring biased locking plates 40. The forward end of the unit is of course attached by connecting spring biased rod 102 to link 100 and attaching cable 110 to arms 76 of the bellcrank 72. The collector unit is simply and efficiently attached by inserting pins 221 and 228 in the respective openings and the entire unit is then ready for operation.

The entire mounting mechanism may be generally termed as an "easy on–easy off" mounting means, since the entire mechanism can be attached to or detached from the tractor in a matter of minutes. Comparable mechanisms of this type heretofore required several hours of time for attachment to or detachment from the tractor. This particular time is of course lost time since the tractor as well as the harvesting mechanism are inoperable during such a period of time.

Furthermore, after being attached to the longitudinal frame of the vehicle the two units are capable of easily being simultaneously moved between raised and lowered positions. Also, each unit is capable of moving from the lowered position when necessary and can be individually adjusted to a separate adjusted position without disturbing the position of the other unit on the frame.

While a commercially acceptable embodiment has been shown and described, it is readily apparent that many of the elements could be eliminated without impairing the advantageous features of the present invention. Thus, for example, the cables 110 could be attached directly to the end 66b of each link 66 and the same end could be directly connected to strap 78 thereby eliminating the bellcrank 72 as well as link 70. Of course, several other features could be modified without departing from the spirit of the invention.

I claim:

1. In a harvesting machine including at least a pair of harvesting units having first and second ends and mounting means supporting each of said units on a transport vehicle, the improvement of said mounting means comprising first means pivotally supporting the first end of each unit on an axis, and second means supporting the second ends of said units on said vehicle, said second means comprising first and second linkage systems interconnected with each other for individual actuation to;
   1. simultaneously adjust said second ends of said units to a predetermined position on said vehicle; and
   2. individually and independently adjust said second ends relative to each other, said first and second linkage systems including a lost motion connection between said systems accommodating individual relative movement of each unit on said vehicle from said predetermined position.

2. A harvesting machine as defined in claim 13 in which said first linkage system includes a shaft extending transversely of said vehicle, power means selectively rotating said shaft in a clockwise or counterclockwise direction on said vehicle and lever means cooperating with said shaft for simultaneously raising and lowering said opposite ends of said units in response to rotation of said shaft in a selected one of said directions.

3. A harvesting mechanism as defined in claim 1 in which said second linkage system comprises manually adjustable means cooperating with each of said units for individually adjusting each said units from said predetermined position, each said adjustable means comprising a manual control lever pivotally supported on an associated unit and linkage means pivoted intermediate its ends on said associated unit and having opposite ends with one end connected to said lever and the opposite end connected to said first linkage system whereby movement of said control lever will pivot said linkage means intermediate its ends to independently raise or lower said associated unit from said position through actuation of said first linkage system.

4. A harvesting mechanism as defined in claim 1 providing the further improvement of each said linkage means including a flexible link accommodating relative movement of said associated unit from said predetermined position to a manually adjusted position.

5. A harvesting mechanism as defined in claim 1, and wherein the harvesting mechanism further includes a collector unit cooperating with said first ends of said harvester units and said vehicle includes a draft control mechanism having a pair of draft arms pivotally supported on the vehicle on said axis pivotally supporting the first end of each unit and means for selectively raising and lowering said arms on said vehicle, the further improvement of a linkage mechanism operatively connecting said collector unit to said vehicle and said draft arms for independent relative movement on the vehicle in response to actuation of said means.

6. A harvesting mechanism as defined in claim 5, in which said linkage mechanism includes first and second links having one end connected at a common pivot to said vehicle and opposite ends pivotally connected vertically spaced points on said collector units with free ends of said draft arms pivotally supported on each collector unit adjacent one of said opposite end connections of said links.

7. In combination with a transport vehicle having a transverse axle and ground engaging members on opposite ends of said axle, a harvester unit supported on said vehicle and mounting means for pivotally supporting said unit on said vehicle, the improvement of said mounting means comprising first means defining a pivot axis on said vehicle adjacent said axle and extending parallel to said axle with one end of said unit pivoted thereon, and second means connected to an opposite end of said unit for pivoting said unit about said pivot axis, said second means comprising a transversely extending shaft pivotally supported on said vehicle adjacent a free end of said unit, power means for selectively rotating said shaft in a clockwise or a counterclockwise direction, a link freely pivoted on said shaft, third means on said shaft engaging said link for rotating said link in one of said directions while allowing relative movement of said link on said shaft in a direction opposite to said one direction, and linkage means connected to said link and to said opposite end of said unit, said linkage means including a lost motion connection between said link and said unit whereby rotation of said shaft in said one direction will move said opposite end of said unit while said lost motion connection will allow relative movement of said unit on said vehicle while said shaft remains in the adjusted position.

8. The combination as defined in claim 7, including the further improvement of separate manually adjustable means comprising a bellcrank pivoted on said unit, a manual control member pivoted on said unit, means connecting one end of said bellcrank to said manual control member and flexible linkage means connecting the opposite end of said unit to said link.

9. The combination as defined in claim 7, including the further improvement of said first means comprising a plate depending from said axle and having a recess therein defining a pivot axis, a pin carried by said one end of said unit and releasably received in said recess and automatic locking means having means defining a first locking position and yieldable to a second nonlocking position whereby relative movement of said pin toward said recess causes movement of said locking means from the first to the second position and return of said locking means to said first position when said pin is in said recess.

10. Mounting means for releasably attaching a pair of harvester units on opposite sides of a longitudinally extending frame of a vehicle comprising a shaft extending transversely of the forward end of said frame and pivotally supported thereon, power means interposed between said frame and said shaft for selectively rotating said shaft in a clockwise or counterclockwise direction, connection means on each end of said shaft for respectively connecting one end of each said units to said frame, each said connecting means comprising linkage means including first and second links, each of said links having one end pivotally supported on a common pivot spaced from said shaft on said frame, means defining a one way connection between said links, means connecting the respective free ends of said links to said one end of said unit and an end of said shaft, and means pivotally supporting the opposite ends of said units on said frame whereby rotation of said shaft in said clockwise or counterclockwise direction will simultaneously raise and lower said units from said frame and said one way connections will accommodate individual raising of each said units on said frame.

11. Mounting means as defined in claim 10, including the further improvement of manually adjustable means carried by each of said units providing individual adjustment of said units from an adjusted position defined by said shaft, each said manually adjustable means including a flexible connection to said shaft accommodating said individual raising of the associated unit on said frame.